(12) United States Patent
Chang et al.

(10) Patent No.: US 11,503,247 B1
(45) Date of Patent: Nov. 15, 2022

(54) METHOD OF MEMC AND RELATED VIDEO PROCESSOR

(71) Applicant: NOVATEK Microelectronics Corp., Hsin-Chu (TW)

(72) Inventors: Chih Chang, Hsinchu (TW); I-Feng Lin, Hsinchu County (TW); Hsiao-En Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/567,910

(22) Filed: Jan. 4, 2022

(51) Int. Cl.
*H04N 7/01* (2006.01)
*G06T 7/254* (2017.01)

(52) U.S. Cl.
CPC ........... *H04N 7/0135* (2013.01); *G06T 7/254* (2017.01); *H04N 7/013* (2013.01); *G06T 2207/10016* (2013.01)

(58) Field of Classification Search
CPC ........ H04N 7/0127; H04N 7/01; H04N 7/013; H04N 7/0135; H04N 7/0157; H04N 7/0137; G06T 2207/10016; G06T 7/254
USPC ....... 348/441, 443, 447, 448, 451, 452, 458, 348/459
See application file for complete search history.

(56) References Cited

U.S. PATENT DOCUMENTS 8,600,178 B1 * 12/2013 Woodall ............... H04N 19/527
382/236

* cited by examiner

*Primary Examiner* — Sherrie Hsia
(74) *Attorney, Agent, or Firm* — Winston Hsu

(57) ABSTRACT

A method of motion estimation and motion compensation for a video processor includes steps of: detecting an input frame rate of a series of input frames; calculating a frame counting value, wherein the frame counting value represents the number of output frame periods between a current input frame and a previous input frame among the series of input frames; calculating a phase step, which is configured to generate a phase coefficient for generating an interpolated frame as an output frame of each of the output frame periods, according to the frame counting value; and generating the interpolated frame based on the current input frame and the previous input frame by using the phase coefficient. Wherein, the step of calculating the frame counting value, the step of calculating the phase step and the step of generating the interpolated frame are consistently performed until the input frame rate is successfully detected.

10 Claims, 3 Drawing Sheets

METHOD OF MEMC AND RELATED VIDEO PROCESSOR

BACKGROUND OF THE INVENTION

1. Field of the Invention

The present invention relates to a method used for a video processor, and more particularly, to a method of motion estimation and motion compensation (MEMC) used for a video processor and the related video processor.

2. Description of the Prior Art

Motion estimation and motion compensation (MEMC) is a technology used for frame interpolation, which allows a series of image frames to be displayed with a higher frame rate. For example, if a 30 Hz source video such as a film is required to be displayed in 60 Hz, an interpolated frame should be added between every two adjacent input frames of the source video, so as to double the frame rate.

The phases of the interpolated frames are calculated based on the input frame rate and the output frame rate; hence, the input frame rate and the output frame rate are requested to be fixed, to ensure that the calculated phases can be stable. Conventionally, the front-end device may inform the frame rate converter of the input frame rate and the output frame rate, and thus the frame rate converter may determine the phase step and phase coefficients (which are used for motion compensation) immediately. However, in several new applications such as the command mode of the mobile industry processor interface (MIPI), the input frame rate is not a fixed value, and instead it varies based on the system commands. Also, the front-end device may not provide the information of the input frame rate for the frame rate converter. Thus, the frame rate converter should dynamically detect the input frame rate to determine the relationship between the input frame rate and the output frame rate, and the MEMC operations may start after the input frame rate is completely detected. Further, the irregular input frame rate is difficult to be detected, resulting in a longer detection time for the input frame sequence. The MEMO may not be feasible in this detection time since the input frame rate and the phases for interpolation are not obtained. Thus, there is a need for improvement over the prior art.

SUMMARY OF THE INVENTION

It is therefore an objective of the present invention to provide a novel method of motion estimation and motion compensation (MEMO) and a related video processor, where the MEMO may be performed when the input frame rate is not yet detected, so as to solve the abovementioned problem.

An embodiment of the present invention discloses a method of MEMO for a video processor. The method comprises steps of: detecting an input frame rate of a series of input frames; calculating a frame counting value, wherein the frame counting value represents the number of output frame periods between a current input frame and a previous input frame among the series of input frames; calculating a phase step, which is configured to generate a phase coefficient for generating an interpolated frame as an output frame of each of the output frame periods, according to the frame counting value; and generating the interpolated frame based on the current input frame and the previous input frame by using the phase coefficient. Wherein, the step of calculating the frame counting value, the step of calculating the phase step and the step of generating the interpolated frame are consistently performed until the input frame rate is successfully detected.

Another embodiment of the present invention discloses a video processor, which is configured to perform the following steps: detecting an input frame rate of a series of input frames; calculating a frame counting value, wherein the frame counting value represents the number of output frame periods between a current input frame and a previous input frame among the series of input frames; calculating a phase step, which is configured to generate a phase coefficient for generating an interpolated frame as an output frame of each of the output frame periods, according to the frame counting value; and generating the interpolated frame based on the current input frame and the previous input frame by using the phase coefficient. Wherein, the step of calculating the frame counting value, the step of calculating the phase step and the step of generating the interpolated frame are consistently performed until the input frame rate is successfully detected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
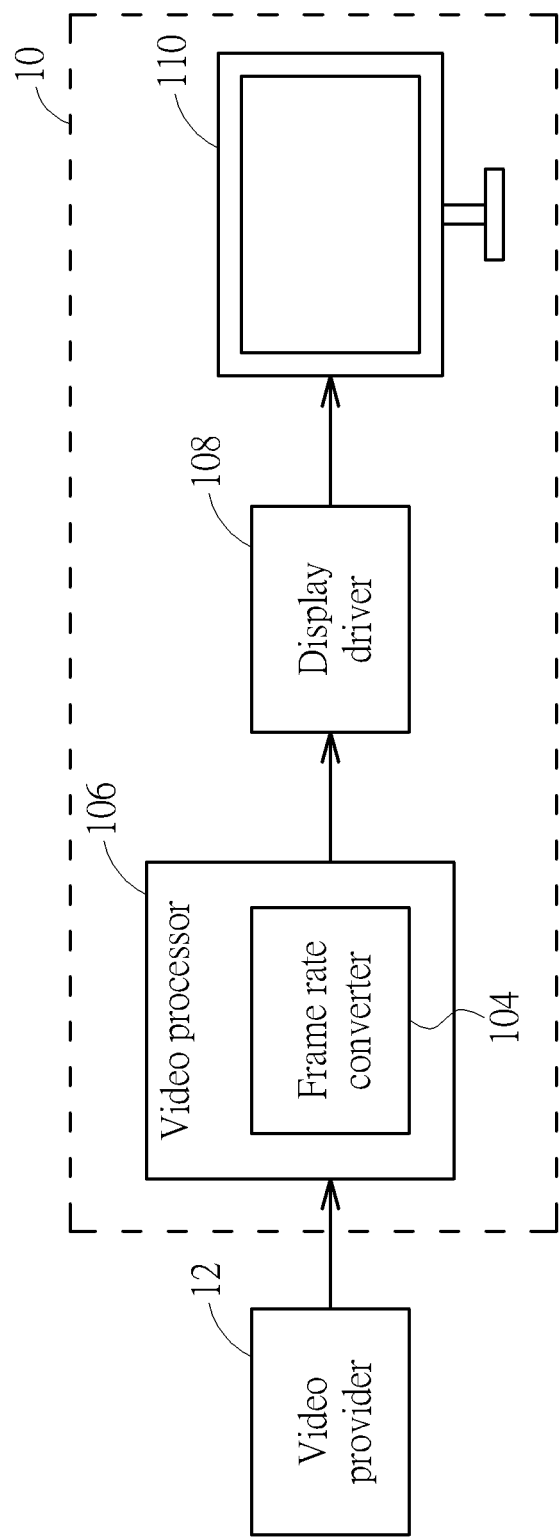
FIG. 1 is a schematic diagram of a display system according to an embodiment of the present invention.

Please refer to FIG. 1, which is a schematic diagram of a display system 10 according to an embodiment of the present invention. As shown in FIG. 1, the display system 10 such as a TV may receive and display a source video having a series of image frames provided by a video provider 12 such as a DVD player or a video streaming service provider communicated with the display system 10 via a wired network or a wireless network. The display system 10 includes a video processor 106, a display driver 108 and a display panel 110. In general, the frame rate of the source video may not be the same as the frame rate to be displayed on the display panel 110. The video processor 106 may include a TV controller integrated circuit (IC) and a frame rate conversion (FRC) IC for converting the source video which usually has a lower frame rate to generate a series of output frames of a higher frame rate to be displayed by the display panel 110. Or, the video processor 106 may be a TV controller IC embedded with a function of FRC. That is, the frame rate converter 104 depicted in FIG. 1 can be regarded as the stand-alone FRC IC or the internal FRC circuit inside the TV controller IC. For example, when receiving a 24-Hz input video having two input frames A and B, the frame rate converter 104 may convert the 2 input frames A and B into 5 image frames A, A, A, B, B in 60 Hz, and perform motion estimation and motion compensation (MEMC) to generate appropriate interpolated frames based on these input frames.

In another embodiment, the video processor 106 may include a graphics processing unit (GPU) and a stand-alone FRC IC, or, the video processor 106 may be a GPU with the internal FRC circuit inside the GPU.

The display driver 108 may convert the image data into data voltage signals and drive the display panel 110 to display the image frames through the data voltage signals. The display driver 108 may include a timing controller, a source driver, a gate driver, and/or any other devices capable of driving the display panel 110. The display panel 110 may be of any type such as a liquid crystal display (LCD) panel, light-emitting diode (LED) display, and plasma display panel (PDP), but not limited thereto.

Figure 2:
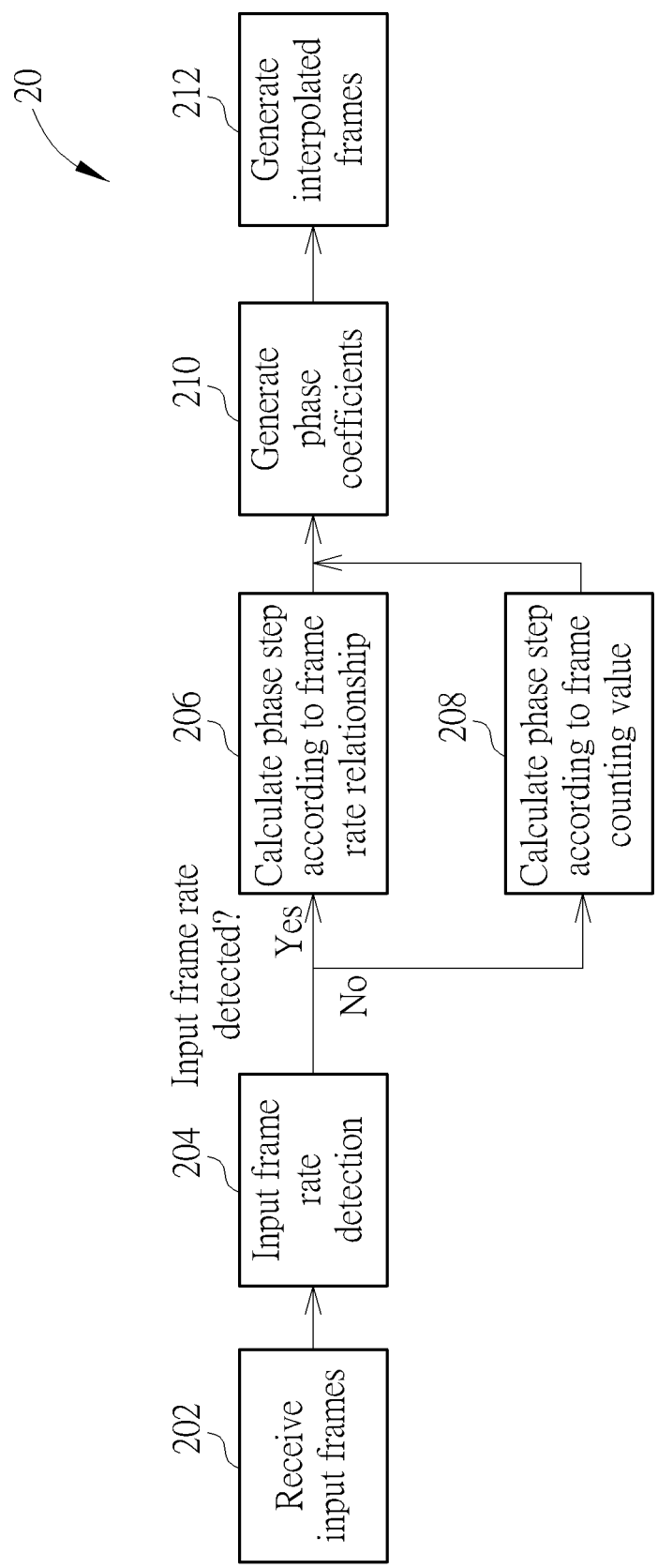
FIG. 2 is a flowchart of an image processing process according to an embodiment of the present invention.

Please refer to FIG. 2, which is a flowchart of an image processing process 20 according to an embodiment of the present invention. The image processing process 20 may be implemented in a video processor, such as the video processor 106 shown in FIG. 1. As shown in FIG. 2, the image processing process 20 includes the following steps:

Step 202: Receive a series of input frames.

Step 204: Detect an input frame rate of the series of input frames.

Step 206: Calculate the phase step according to the relationship of the input frame rate and the output frame rate when the input frame rate is detected.

Step 208: Calculate the phase step according to the frame counting value when the input frame rate is not detected.

Step 210: Generate phase coefficients based on the phase step.

Step 212: Generate the interpolated frames based on the current input frame and the previous input frame by using the phase coefficients.

According to the image processing process 20, the video processor may first receive a series of input frames (Step 202). In an embodiment, the series of input frames may be received by the video processor from a front-end device. The front-end device may be the video provider 12 shown in FIG. 1.

After the input frames are received, the video processor may detect the input frame rate of the input frames (Step 204). Since the front-end device may not provide the frame rate information for the video processor, the video processor may detect the input frame rate when receiving the input frames.

After the input frame rate is detected, the video processor may calculate the phase step according to the relationship of the input frame rate and the output frame rate (Step 206). For example, if the input frame rate is 24 Hz and the output frame rate is 60 Hz, the phase step may be determined to be 2/5. The video processor then generates the phase coefficients based on the phase step (Step 210). For example, if the phase step equals 2/5, the phase coefficients will be 0, 2/5, 4/5, 1/5 and 3/5 repeatedly such that five consecutive output frames (interpolated frames) can be generated based on two consecutive input frames by motion compensation. Therefore, the video processor may generate the interpolated frames based on the current input frame and the previous input frame by using the phase coefficients (Step 212). In other words, the image content of the interpolated frame may be obtained by combining the image content of the current input frame and the image content of the previous input frame (taken as a reference frame) based on the value of the corresponding phase coefficient. The video processor can thereby output a series of output frames containing the interpolated frames.

As mentioned above, the phase step may not be able to obtained according to the relationship of the input frame rate and the output frame rate when the input frame rate is not yet detected. Therefore, before the input frame rate is detected, the video processor may calculate the phase step in another manner, in order to avoid that the MEMO cannot be performed during the long detection time for the input frame rate. According to the image processing process 20, the video processor may calculate the phase step according to the frame counting value (Step 208). The phase step as a result of Step 208 is taken as a temporary phase step used while the input frame rate is not yet detected. The frame counting value may be a value representing the number of output frame periods between a current input frame and a previous input frame among the series of received input frames. In other words, the frame counting value may represent how many output frame periods pass by from receiving the previous input frame to receiving the current input frame.

Therefore, the video processor may include two operation modes. In a first mode where the input frame rate is known or has been detected, the video processor may calculate the phase step and phase coefficients based on the relationship of the input/output frame rates, and correspondingly perform MEMO to generate the interpolated frames based on the calculated phase step and phase coefficients. In a second mode where the input frame rate is unknown or not yet detected, the video processor may calculate the phase step and phase coefficients based on the frame counting value, and correspondingly perform MEMO to generate the interpolated frames based on the calculated phase step and phase coefficients. In such a situation, the video processor may consistently perform the operations of calculating the frame counting value, calculating the phase step based on the frame counting value, and generating the interpolated frames based on the phase coefficients until the input frame rate is successfully detected. Therefore, even if the input frame rate has not been detected, the video processor can still perform MEMO to generate the interpolated frames based on the phase step which is calculated from the frame counting value.

In an embodiment, the video processor may determine the frame counting value by detecting whether an input frame is received in each output frame period.

In an embodiment, according to the frame counting value, the phase step may be calculated through the following formula:

$$P\_Step = \frac{1}{FCV+1};$$

where P_Step is the phase step and FCV is the latest frame counting value. The frame counting value is counted and updated in each output frame period, which is the period in which one output frame is generated. For example, when the output frame rate is 60 Hz, the output frame period is equal to 1/60 second. As for each output frame period, when no input frame is received in this output frame period, the frame counting value may be accumulated by 1; when an input frame is received in this output frame period, the frame counting value may be taken to calculate the phase step and then reset to 0. Therefore, in an output frame period where an input frame is received, the latest frame counting value is used to calculate the phase step based on the above formula; that is, the phase step may be calculated by taking the reciprocal of the accumulation value of the frame counting value plus 1.

Table 1 illustrates an exemplary embodiment where the output frame rate is 60 Hz and the input frame rate is 24 Hz.

The video processor knows that the output frame rate is 60 Hz, but may not be informed of the input frame rate, which should be detected through reception of the input frames. In this embodiment, the input frames A, B, C, D, E, F . . . are received in sequence. The video processor may detect whether an input frame is received in each output frame period. As shown in Table 1, the input reception indication is used to indicate the reception of input frames, where the value "1" indicates that an input frame is received in the output frame period and "0" indicates that no input frame is received in the output frame period.

TABLE 1

| Input | A | | | B | | C | | | D | | E | | | F | |
|---|---|---|---|---|---|---|---|---|---|---|---|---|---|---|---|
| Input reception | 1 | 0 | 0 | 1 | 0 | 1 | 0 | 0 | 1 | 0 | 1 | 0 | 0 | 1 | 0 |
| FCV | 0 | 1 | 2 | 0 | 1 | 0 | 1 | 2 | 0 | 1 | 0 | 1 | 2 | 0 | 1 |
| Currentframe | Z | A | A | B | B | B | C | C | D | D | D | E | E | F | F |
| Previousframe | Y | Z | Z | A | A | A | B | B | C | C | C | D | D | E | E |
| Phase | 2/3 | 0 | 1/2 | 0 | 1/3 | 2/3 | 0 | 1/2 | 0 | 2/5 | 4/5 | 1/5 | 3/5 | 0 | 2/5 |

Subsequently, the video processor may calculate the frame counting value (FCV) based on the input reception indication. As shown in Table 1, the frame counting value is increased by 1 in the output frame periods where no input frame is received (i.e., the input reception indication is 0), and the frame counting value is reset to 0 in the output frame periods where an input frame is received (i.e., the input reception indication is 1). Before the frame counting value is reset to 0, the latest frame counting value is used to calculate the phase step. For example, if the latest frame counting value is 2, the phase step equals 1/3, and if the latest frame counting value is 1, the phase step equals 1/2. The video processor then generates the phase coefficients based on the phase step. As shown in Table 1, during the periods where the current frame is A and the previous frame is Z, the phase step is 1/2 and the phase coefficients are 0 and 1/2. When the phase coefficient reaches 1, it will return to 0 and restart to increase, and meanwhile the current input frame and the previous input frame used for performing interpolation may be taken from the next input frames. Subsequently, during the periods where the current frame is B and the previous frame is A, the phase step is 1/3 and the phase coefficients are 0, 1/3 and 2/3. During the periods where the current frame is C and the previous frame is B, the phase step is 1/2 and the phase coefficients are 0 and 1/2.

In this embodiment, the input frame rate is successfully detected by the video processor when the input frame D is received. Subsequently, the phase step and phase coefficients start to follow the regular film mode 3:2 corresponding to the relationship of the input frame rate 24 Hz and the output frame rate 60 Hz.

Therefore, according to the embodiment of the present invention, the method of counting frames is applied to calculate the temporary phase step, which is used until the input frame rate is successfully detected. During the periods when the input frame rate has not been detected and/or determined, the temporary phase step is used to perform MEMC and generate the interpolated frames. After the input frame rate is detected and/or determined, the phase step determined from the input/output frame rate relationship is used instead.

In general, when the display system is powered on, the video may start to be displayed before the input frame rate is detected, and the method of using the temporary phase step calculated based on the frame counting value to perform MEMC and generate the interpolated frames may still provide an improvement on the picture quality as compared to the conventional situation where no MEMC is performed before the input frame rate is successfully detected.

Figure 3B:
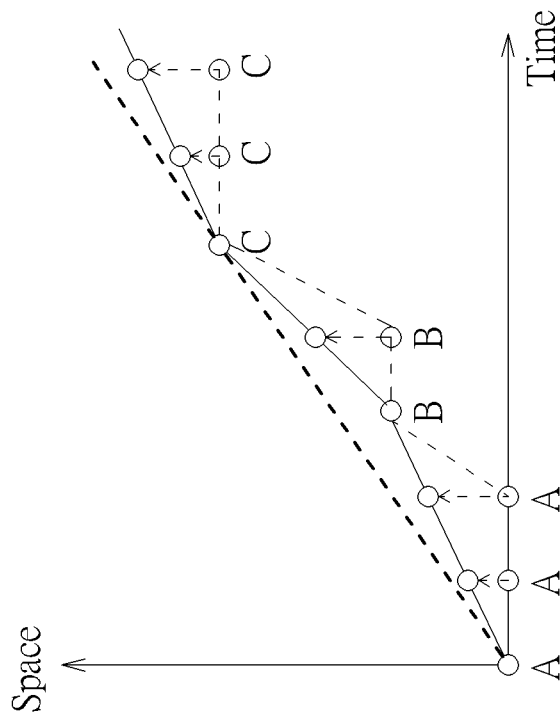
FIGS. 3A and 3B are schematic diagrams of a series of output frames and input frames of a video processor.
Figure 3A:
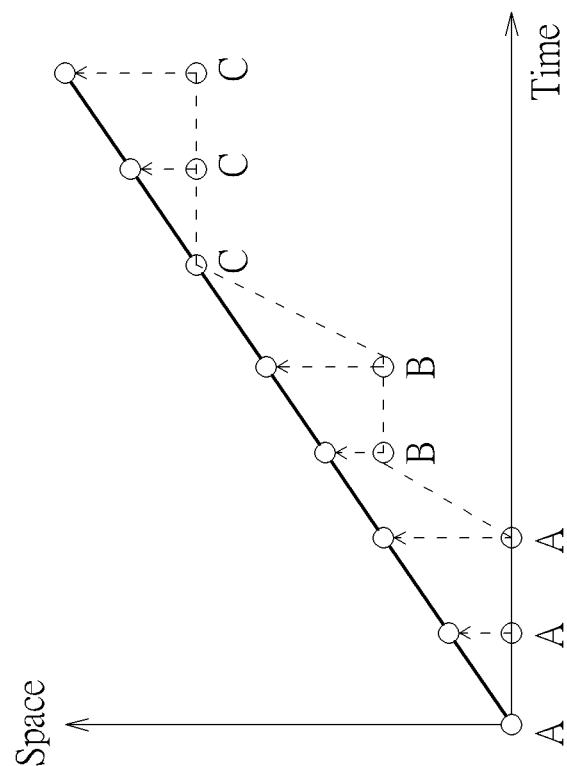

Please refer to FIGS. 3A and 3B, which are schematic diagrams of a series of output frames and input frames of a video processor such as the video processor 106 shown in FIG. 1. In detail, FIG. 3A shows a situation where the input frame rate is successfully detected, where the output frames are generated based on the regular phase step and phase coefficients determined according to the input/output frame rate relationship (e.g., 0, 2/5, 4/5, 1/5, 3/5 repeatedly as in the film mode 32). In this implementation, the output frames may be entirely smooth under the MEMC operations.

FIG. 3B shows a situation where the input frame rate is not yet detected, where the output frames are generated based on the regular phase step and phase coefficients determined according to the frame counting value (e.g., 0, 1/3, 2/3, 0, 1/2 repeatedly). As shown in FIG. 3B, although the MEMC performed based on the temporary phase step cannot achieve an entirely smooth movement as realized through the regular phase coefficients, it can still achieve an improvement on the picture quality as compared to the situation where no MEMC is performed for reducing the judders in the image content of the output frames.

Please note that in this embodiment, the video processor is configured to receive the input frames without duplication, where the input frame rate may be 24 Hz or 30 Hz in general, and the frame rate converter in the video processor is configured to generate the output frames in a higher output frame rate such as 60 Hz or 120 Hz. In such a situation, the frame counting value may be calculated based on the input reception indication indicating whether an input frame is received in each output frame period. In another embodiment, the video processor may receive a series of input frames which are duplicated after pull-down and may be represented as A1, A2, A3, B1, B2, C1, C2, C3, D1, D2 . . . , where the input frame rate may be 60 Hz.

Table 2 illustrates an exemplary embodiment where the output frame rate is 60 Hz and the input frame rate is 60 Hz under the application where the received input frames (source input frames in FIG. 2) are being duplicated after pull-down before being received by the video processor. In this embodiment, the input reception indication is always "1" because a source input frame is received in each output frame period. Therefore, the video processor may further calculate a difference between every two adjacent source input frames (e.g., accumulating pixel data differences of all pixels for every two adjacent input frames) and use a frame difference value as a flag to indicate the degree of difference between every two adjacent source input frames.

TABLE 2

| Source input | A1 | A2 | A3 | B1 | B2 | C1 | C2 | C3 | D1 | D2 | E1 | E2 | E3 | F1 | F2 |
|---|---|---|---|---|---|---|---|---|---|---|---|---|---|---|---|
| Input | A1 | | | B1 | | C1 | | | D1 | | E1 | | | F1 | |
| Input reception | 1 | 1 | 1 | 1 | 1 | 1 | 1 | 1 | 1 | 1 | 1 | 1 | 1 | 1 | 1 |
| Frame difference | 1 | 0 | 0 | 1 | 0 | 1 | 0 | 0 | 1 | 0 | 1 | 0 | 0 | 1 | 0 |
| FCV | 0 | 1 | 2 | 0 | 1 | 0 | 1 | 2 | 0 | 1 | 0 | 1 | 2 | 0 | 1 |
| Currentframe | Z | A | A | B | B | B | C | C | D | D | D | E | E | F | F |
| Previousframe | Y | Z | Z | A | A | A | B | B | C | C | C | D | D | E | E |
| Phase | 2/3 | 0 | 1/2 | 0 | 1/3 | 2/3 | 0 | 1/2 | 0 | 2/5 | 4/5 | 1/5 | 3/5 | 0 | 2/5 |

As shown in Table 2, for example, the frame difference value may be "1" if the difference between the current source input frame and the previous source input frame (such as B1 and A3) is greater than a threshold, which means that the currently received source input frame (B1) has new image content. The frame difference value may be "0" if the difference between the current source input frame and the previous source input frame (such as A3 and A2) is less than the threshold, which means that the currently received source input frame (A3) may be duplicated from the previous source input frame (A2). In this embodiment regarding Table 2, the role of input reception indication in calculating the frame counting value (FCV) is replaced by the frame difference value. In detail, the frame counting value is increased by 1 if the frame difference value is "0", and the frame counting value is reset to 0 if the frame difference value is "1". The latest frame counting value before reset is used to calculate the phase step.

In this embodiment, the video processor may take a current source input frame as one of the series of input frames (denoted in the second row "input (frames)" of Table 2) when the frame difference value indicates that the difference between the current source input frame and the previous source input frame is greater than a threshold. Therefore, the method to generate the frame counting value, phase step and phase coefficients for the source input frames illustrated in Table 2 may be same as the method illustrated in the first embodiment and Table 1. The input frames generated by the video processor may further be used to perform MEMC based on the phase step calculated according to the frame counting value, as the operations described in the above paragraphs.

For example, supposing that the video processor receives a series of source input frames A1, A2, A3, B1, B2, C1, C2, C3, D1, D2 . . . , the source input frames A1, B1, C1 and D1 may be taken as the input frames similar to the input frames without cadence in Table 1, which may be used to calculate the phase coefficients for MEMC through the related operations as shown in Table 1.

Please note that the present invention aims at providing a novel method of MEMC, which is performed based on the phase step calculated according to the frame counting value when the input frame rate is not detected. Those skilled in the art may make modifications and alterations accordingly. For example, in the above embodiments, the output frame rate is 60 Hz, and the MEMC method is applicable to the input frames with cadence or pull-down received in 60 Hz and the input frames without cadence or pull-down received in 24 Hz. The values of the frame rates are merely examples used to facilitate the illustrations of the embodiments. In another embodiment, other frame rates may also be feasible. For example, the video processor may be configured to generate the output frames in 120 Hz, and the phase step and phase coefficients may be generated accordingly to achieve the higher output frame rate.

In the above embodiments of the present invention, the operations of calculating the phase step and phase coefficients based on the frame counting value may be performed when the input frame rate is not yet detected. In fact, the related implementations may be applicable to any situation where the input frame rate or the relationship between the input/output frame rates is unknown or may not be well determined. For example, the video processor may have several configurations which are capable of converting one of predetermined input frame rates (such as 24 Hz and 30 Hz) to one of predetermined output frame rates (such as 60 Hz and 120 Hz). When detecting that the input frame rate is different from any of the predetermined ones, the video processor may determine that the regular phase step and phase coefficients may not be generated under the detected input frame rate, and may thereby apply the frame counting value to generate the phase step and correspondingly perform the MEMO. That is, if the detected input frame rate does not conform to any of the configurations of the video processor, and/or the video processor may not determine an appropriate cadence based on the detected input frame rate, the method of counting frames may be applied until a new feasible input frame rate is detected. In another embodiment, the input frame rate may change during display. When detecting that the input frame rate changes, the video processor may be switched to the operation mode where the frame counting value is used to calculate the phase step, until a new input frame rate is stable and successfully detected by the video processor.

To sum up, the present invention provides a method of MEMO and a related video processor. The video processor may perform the MEMO when the input frame rate is not yet detected, where the phase step may be calculated based on the frame counting value, which refers to a value representing how many output frame periods pass by from receiving the previous input frame to receiving the current input frame. Based on the method of the present invention, the MEMO may be performed before the input frame rate is successfully detected, resulting in a better picture quality than the situation where no MEMO is performed. Further, the method of calculating the phase step based on the frame counting value allows the phase step to be determined quickly, which avoids that the MEMO cannot be performed during a long time for detecting the input frame rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of motion estimation and motion compensation for a video processor, comprising:
   detecting an input frame rate of a series of input frames;
   calculating a frame counting value, wherein the frame counting value represents the number of output frame periods between a current input frame and a previous input frame among the series of input frames;

calculating a phase step, which is configured to generate a phase coefficient for generating an interpolated frame as an output frame of each of the output frame periods, according to the frame counting value; and generating the interpolated frame based on the current input frame and the previous input frame by using the phase coefficient;

wherein, the step of calculating the frame counting value, the step of calculating the phase step and the step of generating the interpolated frame are consistently performed until the input frame rate is successfully detected.

2. The method of claim 1, wherein the step of calculating the frame counting value comprises:

for each of the output frame periods, accumulating the frame counting value by 1 when no input frame is received in the output frame period; and obtaining the frame counting value when an input frame is received in the output frame period and then resetting the frame counting value to 0.

3. The method of claim 2, wherein the step of calculating the phase step comprises:

calculating the phase step by taking a reciprocal of the accumulation value of the frame counting value plus 1.

4. The method of claim 1, wherein the series of input frames are received by the video processor from a front-end device.

5. The method of claim 1, further comprising:

receiving a series of source input frames from a front-end device;

determining a plurality of frame difference values, wherein each of the frame difference values is generated based on every two adjacent source input frames among the series of source input frames; and taking a first source input frame among the series of source input frames as one of the series of input frames when the frame difference value corresponding to the first source input frame indicates that the difference between the first source input frame and a previous source input frame previous to the first source input frame is greater than a threshold.

6. A video processor, configured to perform the following steps:

detecting an input frame rate of a series of input frames;

calculating a frame counting value, wherein the frame counting value represents the number of output frame periods between a current input frame and a previous input frame among the series of input frames;

calculating a phase step, which is configured to generate a phase coefficient for generating an interpolated frame as an output frame of each of the output frame periods, according to the frame counting value; and generating the interpolated frame based on the current input frame and the previous input frame by using the phase coefficient;

wherein, the step of calculating the frame counting value, the step of calculating the phase step and the step of generating the interpolated frame are consistently performed until the input frame rate is successfully detected.

7. The video processor of claim 6, wherein the step of calculating the frame counting value comprises:

for each of the output frame periods, accumulating the frame counting value by 1 when no input frame is received in the output frame period; and obtaining the frame counting value when an input frame is received in the output frame period and then resetting the frame counting value to 0.

8. The video processor of claim 7, wherein the step of calculating the phase step comprises:

calculating the phase step by taking a reciprocal of the accumulation value of the frame counting value plus 1.

9. The video processor of claim 6, wherein the series of input frames are received by the video processor from a front-end device.

10. The video processor of claim 6, further being configured to perform the following steps:

receiving a series of source input frames from a front-end device;

determining a plurality of frame difference values, wherein each of the frame difference values is generated based on every two adjacent source input frames among the series of source input frames; and taking a first source input frame among the series of source input frames as one of the series of input frames when the frame difference value corresponding to the first source input frame indicates that the difference between the first source input frame and a previous source input frame previous to the first source input frame is greater than a threshold.

* * * * *